United States Patent [19]
Samuels

[11] 3,938,554
[45] Feb. 17, 1976

[54] CRYOGENIC CONTROLLER DEVICE

[76] Inventor: W. Edward Samuels, 3119 Essex Road, Cleveland Heights, Ohio 44118

[22] Filed: June 24, 1974

[21] Appl. No.: 482,338

[52] U.S. Cl. .............. 137/625.61; 91/47; 62/514 R
[51] Int. Cl.[2] ................. F16K 31/385; F16K 11/07
[58] Field of Search............ 137/625.6, 625.66, 315; 62/514; 251/25, 28, 61.3, 46, DIG. 4; 91/47

[56] References Cited
UNITED STATES PATENTS

| | | | |
|---|---|---|---|
| 3,303,747 | 2/1967 | Demay et al. ............................ | 91/47 |
| 3,326,239 | 6/1967 | Saint-Joanis et al. ........... | 137/625.66 |
| 3,519,019 | 7/1970 | Rieschel ............................ | 137/625.6 |
| 3,530,894 | 9/1970 | Henzgen ........................... | 137/625.6 |
| 3,653,408 | 4/1972 | Coiner .................................. | 251/28 X |
| 3,670,771 | 6/1972 | Dewberry ....................... | 137/625.6 |
| 3,812,545 | 5/1974 | Lanahan ....................... | 251/DIG. 4 |

Primary Examiner—Martin P. Schwadron
Assistant Examiner—Robert J. Miller
Attorney, Agent, or Firm—P. D. Golrick

[57] ABSTRACT

A device providing gas-powered logic responsive to a sensor such as a gas discharging type level probe and actuating valving controlling flow of liquid to be dispensed; and adapted to valving either for a volatile, especially cryogenic liquid utilizing the liquid's vapor pressure from a free gas space in a storage vessel top region as a power source both for control function and for the liquid transfer through a valve to a receiver, or with use of a separate gas supply for powering the probe, logic and amplifier, valving which applies liquid transferring pressure to a free gas space of a source vessel or vents the same for liquid transfer cut off, for volatile or non-volatile liquid.

27 Claims, 8 Drawing Figures

CRYOGENIC CONTROLLER DEVICE

The present invention relates to a controller device particularly useful in controlling transfer of volatile or non-volatile liquids, but especially advantageous for volatile cryogenic liquids, such as liquid air, nitrogen, oxygen, hydrogen or helium to be transferred intermittently from a source vessel usually to a receiving vessel where a certain level of liquid is to be maintained within a certain range.

The present invention will be discussed in terms of the use of and handling of liquid nitrogen, though it is to be understood that it may have application in other environments and with other volatile, especially cryogenic, liquids, with certain aspects of the invention also having utility with respect to operations even with non-volatile liquids.

In the operations utilizing cryogenic liquids it is often necessary to maintain a certain liquid level or level range in a receiving vessel where the level is continuously dropping due to evaporation. Thus in high vacuum equipment, liquid nitrogen may have to be maintained in a Dewar flask surrounding a vapor trap on the vacuum line, requiring constant operator attention to replenish the liquid nitrogen as needed.

Obvious and well known risks, inconveniences, and other disadvantages of manual handling of flasks for transferring any cryogenic liquid have led to development of automatic systems to deliver the liquid as needed to maintain the desired receiver minimum level.

Because of the extremely low liquid temperatures, ordinary pumps and other components of glass, metal and other common materials are less desirably used; and therefore transfer systems are common wherein a gas from a pressurized source, such as nitrogen from a pressure cylinder, is applied through appropriate control and reducing valves to the cryogenic liquid surfaces in a closed source vessel to expel it through a delivery line to the receiver. Now this has been done at times under manual control, and also by liquid level control means sensing the level in the receiver, to actuate automatically a valve in the transfer-powering gas line; or where the liquid source is continuously gas-pressurized, to operate a solenoidal valve in the liquid delivery line.

Such non-manual transfer expedients have been attended by various awkward or undesirable features, as in relatively high costs or complexity, in required external power sources, such as an electric power or a gas pressurizing source; and with certain liquified gases, especially liquid hydrogen or oxygen, in some aspects of required construction or components, or in the very use of electric power, which should as far as possible be avoided from safety considerations.

In brief, the present invention provides a gas energized controller device which is reliable, compact, comparatively low in costs of manufacture, maintenance and use. The device as well can conveniently as a unit incorporate valving means for use in dispensing a cryogenic liquid to a receiver and maintaining therein at least a certain minimum level. One, and a preferred form, uses the vapor pressure of the gas deriving from the evaporating liquid as a liquid "pumping" or propelling power source and also as an operating medium and power source in the liquid level sensing and liquid delivery control system, thus obviating need of any external pressurized gas source or electric power source to move the liquid, or even of use of the electric power in the control powering system; the more remote power source, of course, being the heat of the environment. A second controller form, basically identical with the first, is appropriate where a separate external pressure gas source is to be used for level sensing and valved for liquid pumping.

It is then the general object of the present invention to provide an improved gas energized controller device.

Another object is to provide a gas energized controller and operated valving unit for use in automatically dispensing volatile especially cryogenic, liquids to a receiver where a certain liquid level or range is to be maintained.

Another object is to provide a controller device of the type described which is responsive to back pressure signals of a gas type level sensing probe to initiate and terminate liquid transfer flow.

Another object is the provision of a controller device of the type described which may be operable independently of external power sources other than ambient environmental heat in controlling transfer of a cryogenic liquid from a supply vessel to a receiver where a certain minimum liquid level is to be maintained.

Another object is the provision of a controller of the type described which in a practical sense is self-powered both for moving a cryogenic liquid from a supply vessel to a receiver vessel and also for operation of means sensing the need for and accordingly initiating and terminating the delivery of the liquid to the receiver.

Still another object is to provide a controller which is quite compact and simple in structure, while adapted to provide quasi-snap-action valving in the initiation and termination of liquid delivery.

A still further object is the provision of a controller form of the type described which when used in a self-powered transfer system (i.e., with a portion of the evaporating liquid used as both a liquid-moving power supply and as a power supply for the control system) is adapted to close clustering of a plurality of controllers on one supply vessel serving several receivers; and to provide other cluster-forming components of convenient form.

Still another object is to provide a transfer system controller containing a minimum of moving parts.

Other objects and advantages will appear from the following description and the drawings wherein.

Figure 1:
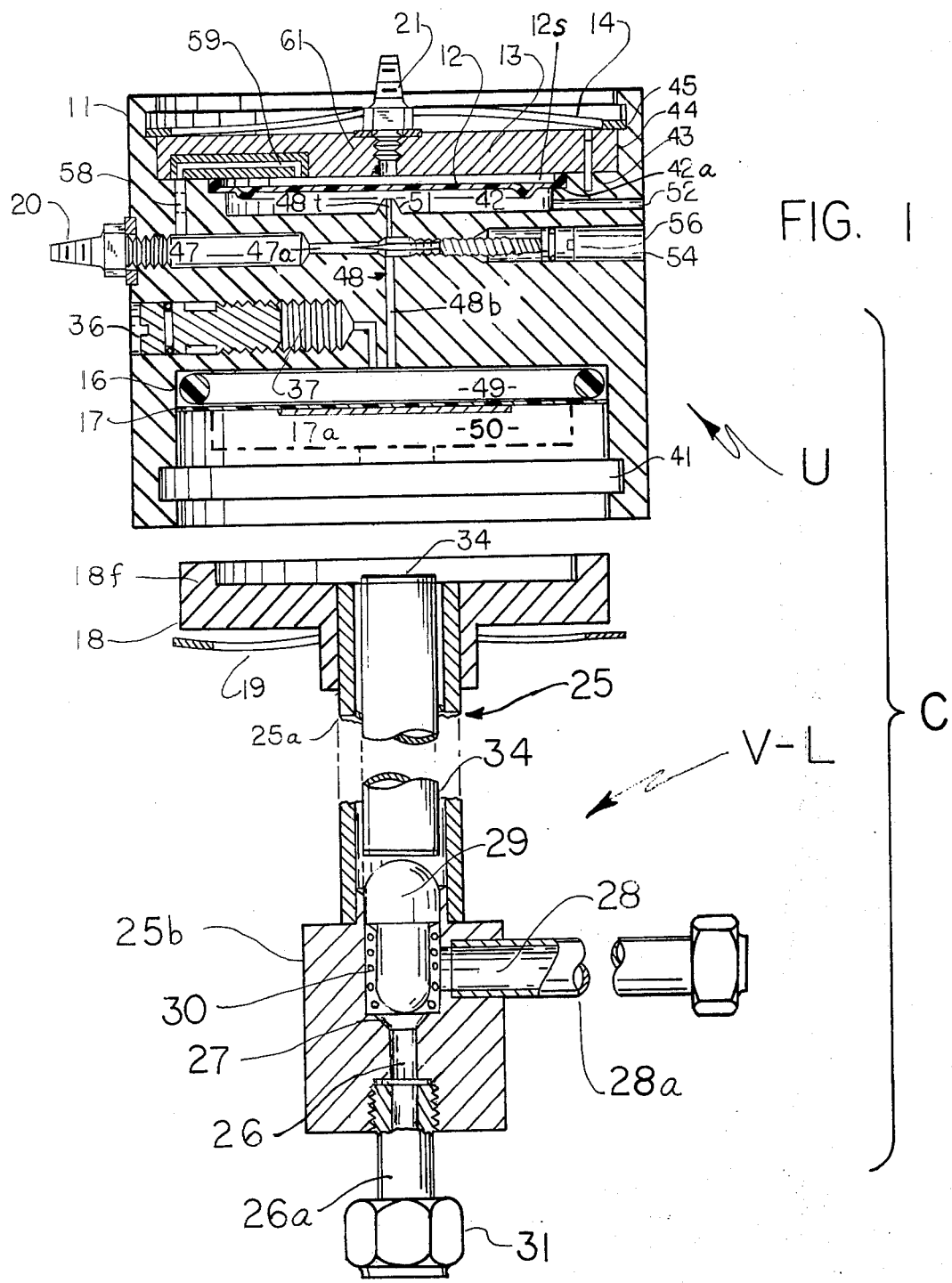
FIG. 1 is an axial or longitudinal sectional view of a unit embodying the present invention, partially exploded with a valving sub-assembly adapted to handle a liquid to be dispensed.
Figure 7:
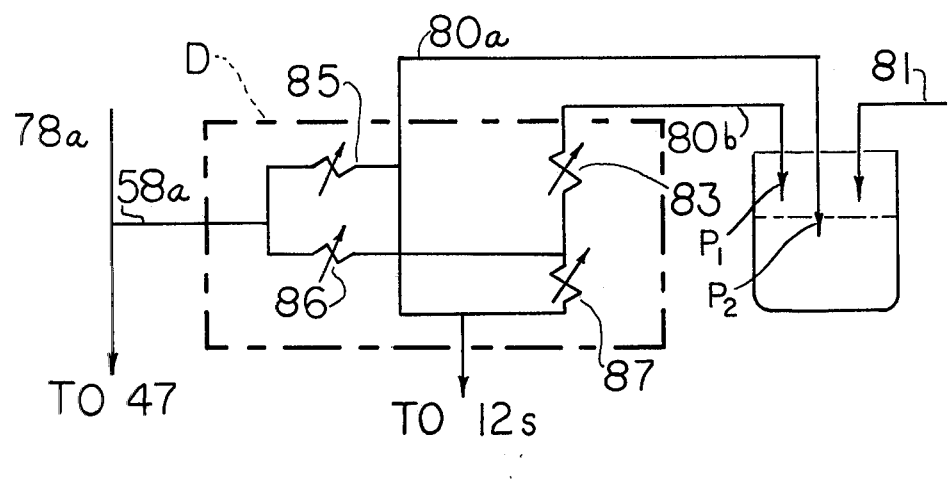
Figure 6:
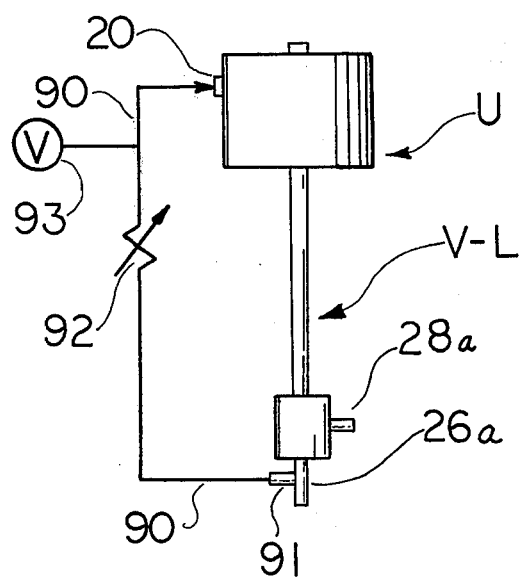

FIG. 6 quasi-schematically presents a modification of FIG. 1;

FIG. 7 is a schematic diagram of a dual probe.

GENERAL ORGANIZATION

Figure 2:
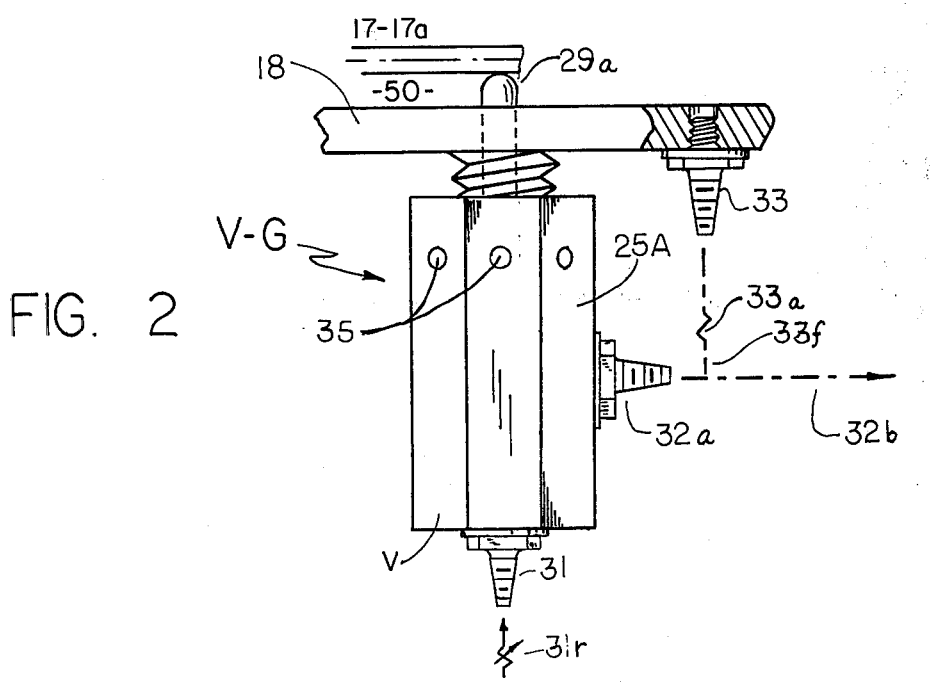
FIG. 2 is a fragmentary view corresponding to FIG. 1, but with a second form of valving sub-assembly adapted to control application of a gas pressure above cryogenic liquid in a supply flask for liquid transfer purposes.

One embodiment of the invention is represented in FIG. 1 by a controller device C comprising a larger basic assembly U of fluidic amplifier sections and an associated liquid valving sub-assembly V-L, which basic assembly is adapted as well to use of the gas-valving sub-assembly V-G of FIG. 2; and even to ready removal of one and substitution of the other sub-assembly. However, the basic assembly components of FIG. 1 may be fabricated as a controller unit with either form of valving sub-assembly, but not intended for such changeability.

In FIG. 1, the basic assembly U, in stricter sense the control unit, comprises a cylindrical body or block 11 (e.g., of aluminum) concentrically recessed at one end to receive a molded (e.g., of Buna-N) elastomeric signal responsive or sensor diaphragm 12, and an aluminum cover plate disc 13 held by a bowed internal C-ring or retainer 14; the body being also concentrically recessed at the other to receive a precision spacing and sealing O-ring 16 of Buna-N, a second elastomeric diaphragm 17 also of Buna-N, here at times termed a "power diaphragm", and a closure plate disc 18 secured by a bowed internal C-ring or retainer 19 and also carrying the valving sub-assembly V-L actuated by unit U. Plate 18 is upwardly rim-flanged at 18f, the more effectively to clamp peripherally the diaphragm 17.

Thus the secured cover plates with the body recesses form diaphragm receiving chambers spanned and divided by the diaphragm. Internal gas passageways are provided as hereinafter described from the powering or energizing gas supply connection spud 20 to the sensor gas space with it sensing gas probe connection spud 21 on one side of diaphragm 12, to a vented space on the other side thereof, and to a power diaphragm operating gas space above diaphragm 17.

Inward from its peripherally clamped portion, a rolling diaphragm the diaphragm 12 conventionally has a molded-in concentric convoluted formation of somewhat U-shaped cross-section which establishes an effective spring constant of the diaphragm for displacements within designed range. Diaphragm 17, for the limited valve actuating displacements involved in these applications of FIGS. 1 and 2, is not shown as a rolling diaphragm, which is appropriate in a controller unit U capable of greater diaphragm excursions for more universal application.

O-ring 16 may be made of any relatively stiff resilient elastomer, offering compressibility suitable to its spacing and sealing functions. Also in diaphragm 17, a top side peripheral flat spacer bead as in 12, may be used rather than the separate O-ring 16. Of course, for oxygen service all components, especially the diaphragms, O-ring, and gasket components, must be oxygen-compatible from safety and durability considerations.

LIQUID VALVING—FIG. 1

Valving sub-assembly V-L comprises a body 25 including a stainless steel body extension tube 25a at its top end coaxially secured to the stainless steel plate disc 18 in or aligned with a central disc aperture, and in the stainless steel body block 25b at its bottom end having an axial liquid inlet passage 26, terminating internally at or through the 45° beveled inlet valve seat 27, from which communication to the lateral radial liquid outlet or discharge port 28 in branch 28a is controlled by a shouldered Kel-F valving member 29, biased toward normally open position by helical compression spring 30.

Figure 3:
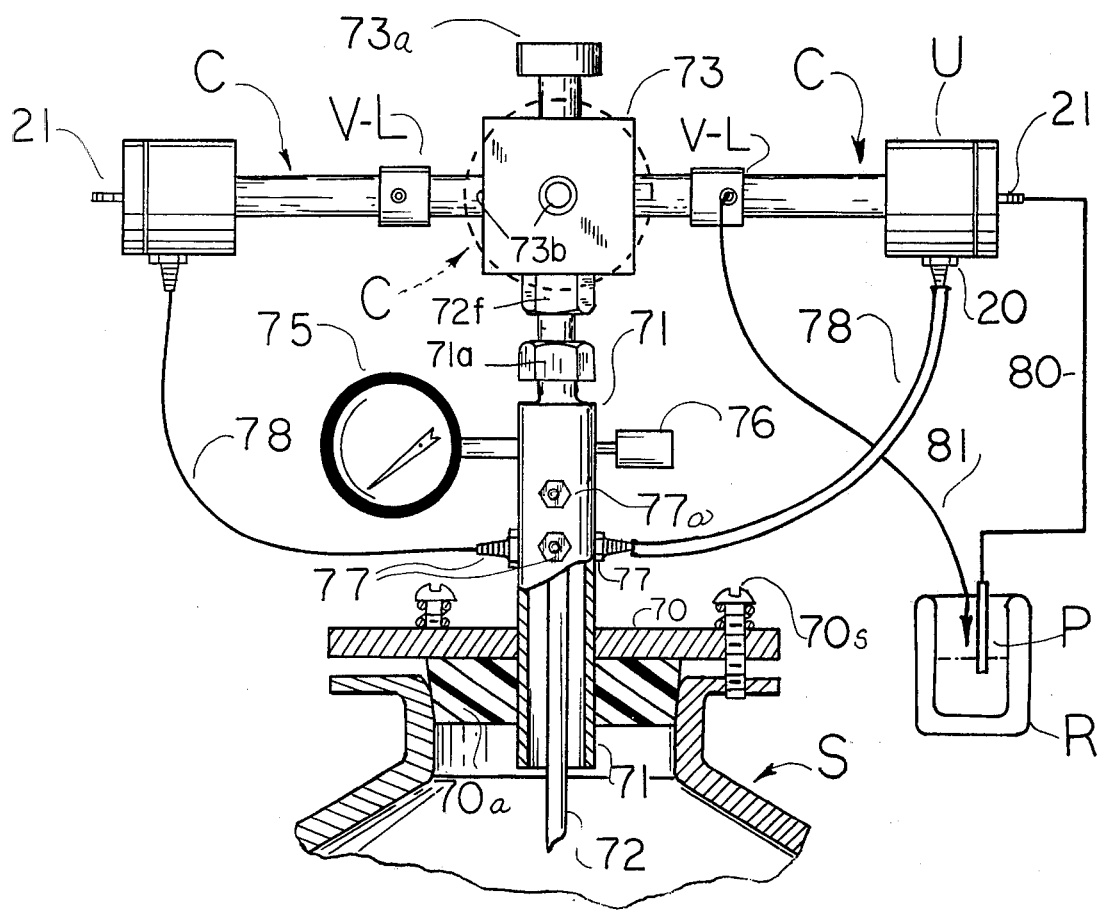
FIG. 3 is a somewhat generalized representation of a fluidic sensing and cryogenic fluid supply system utilizing plural controllers of the form appearing in FIG. 1 clustered on a header or manifold arrangement for controlling cryogenic fluid delivery from one source vessel to a plurality of traps or other use sites.

The valve body lower or liquid inlet end 26a and the end of liquid outlet branch 28a are respectively provided with connector means or fittings 31, 32 for suitable metal or elastomer tubing, to connect the same to a liquid supply vessel and to a receiving vessel as in FIG. 3. An operating push rod 34 received with sliding clearance in tube 25a to project slightly above the valve supporting housing plate 18, opposite diaphragm 17, is shiftable, by the latter, in a mechanical output applying valve closing thrust to the rounded upper end of valve member 29. The length of body 25a is selected to space the liquid-traversed portion of the valve well away from the top plate 18, i.e., from the basic unit U, and rod 34 is preferably made with an appropriate material and section to minimize heat transmission to that portion from the rest of the device. For this purpose, rod 34 is a thin-walled stainless steel tube with closed ends.

GAS VALVING—FIG. 2

The gas valving sub-assembly V-G of FIG. 2 in mechanical essentials is similar to that of FIG. 1, but since it is not traversed by cryogenic liquid, the body 25 of valve V may be quite short, with elimination of the long push rod, and the valving member accordingly having a diametrically reduced elongation 29a to project slightly above plate 18 to accept the unit's mechanical output. The connector means, here shown as simple gasketed plastic-tubing-connecting spuds at inlet 31a and at outlet 32a threaded into female-threaded inlet and outlet body passages, are selected for the tubing or lines required by the gas pressure to be handled by the valve V. Here however, the valve may be a commercially available normally open three-way valve; that is, for an open position of the valving member, the gas outlet 32a is put in communication with inlet 31a; but for an off position it is cut off from the inlet 31a and put into communication with vent apertures 35 to the atmosphere. A variable flow resistor 31r may be in effect included in the inlet 31a; and a connector 33 may be provided in a threaded hole through plate 18 for a feedback line tubing connection 33f to the gas delivery line 32b by which 32a discharges to the supply Dewar to be pressurized. A feedback line flow resistor 33a may be incorporated in connector 33.

CONTROLLER DETAILS

The lower end recess of body 11 as shown is a plain shallow flat bottom cylindrical bore, internally circumferentially grooved at 41 to receive the retainer C-ring 19 at such spacing from the flat recess bottom, relative to the thickness of disk plate 18, of diaphragm 17 and of O-ring 16, that the latter are held in sealed relation relative to the body; the plate 18 in effect clamping the diaphragm 17 peripherally against ring 16, and thus resiliently compressing 16 and 17, and as a bottom wall defining a working chamber or gas space for diaphragm 17. To the bottom side of the latter there is vulcanized or adhesively bonded a concentric stiffening disk 17a, the more effectively to apply the gas-pressure generated force against stem or rod 34 (or to the projecting end 29a of the valve member in FIG. 2), and also to limit reduction of the effective diaphragm area near the end of the diaphragm descent by a stretching of diaphragm material downwardly past the rod end into contact with the plate 18. The composite diaphragm structure 17—17a will usually be referred to as the power diaphragm and at times only by the reference numeral 17.

Similarly the top plate 13 serves to clamp the diaphragm disk 12 peripherally against an inner counterbore shoulder 42a formed between the shallow flat-bottomed cylindrical inner recess space 42 and the larger radial shoulder 43 of the cover-receiving outer counterbore 44 internally circumferentially grooved at 45 for retainer 14. Plate 13 bottoming on shoulder 43 clamps the sensor diaphragm periphery which on its upper side has a continuous rib located over shoulder 42a; and thus a sensor gas working space 12s is provided between the under-face of plate 13 and the diaphragm upper face.

The energizing gas inlet passage 47, threaded for the energizing gas supply tubing connector or spud 20, is radially extended in a reduced inner end 47a as a communicating passageway intersecting a small axial branch passage 48, having a bottom part 48b opening downwardly to a power diaphragm gas operating space 49 above diaphragm 17, and a top part 48t opening upwardly to a vented space 42 below diaphragm 12, through the flat-topped conical central boss 51, in effect a seat for sensor diaphragm 12 as a valve member relative to passage 48t. The flat finished top of boss 51 is slightly below the level of shoulder 42a to provide a normal gap or working clearance below the diaphragm. Space 42 in turn communicates with ambient atmosphere through radial vent passage 52, presenting a quite large flow area as compared with 48t.

A needle valve plug 56, having a threaded engagement and an O-ring seal respectively with a threaded inner part and an unthreaded outer part of a radial bore 54, is diametrically aligned threaded outer part of a radial bore 54, is daimetrically aligned with and tool-adjustable relative to the mouth of 47a as a seat, for timed overfill setting purposes to be explained. An ancillary adjustment may be provided by an O-ring sealed screw plug 36 threaded in a bore 37 as an adjustable volume chamber communicating with, and hence effectively a part of, space 49.

From a vertical communicating passage 58 drilled through shoulder 43 to energizing gas inlet passage 47, gas passes over the diaphragm rib to the top working area of the diaphragm via a milled inner face recess of plate 13, or through an aligned fixed fluidic resistor element 59 cemented therein as shown, and thus to the plate port 61 provided with the threaded-in liquid level sensing connector spud 21. By a hole in plate 13 and a locating pin in shoulder 43, alignment is maintained between passage 58 and the outer end of the milled groove or of resistor 59 therein.

The resistor 59 may also be a selected length of precision capillary tubing sealed in passage 58; or it may take the form of a variable resistor, by including a needle valve plug, e.g., threaded into plate 18 or body 11 to cooperate with passage 58 or a port thereof, thereby forming an adjustable restriction, primarily as a simpler manufacturing expedient to obtain the required fluid resistance.

Though the body 11 of the unit U may be made from various materials, even of a dimensionally stable plastic, whereby much of the shape required may be obtained in an "as molded" piece to minimize machining, where the total device is to include a valve handling cryogenic liquid, a metal is desirable, e.g., aluminum which is not only relatively cheap to work as well as in material cost, but also affords a "reverse heat sink" feed a small amount of heat into the upper end of the body tube to hold back the advance of frosting or icing.

NORMALLY CLOSED MODIFICATION OF UNIT C—FIG. 1A

Figure 1A:
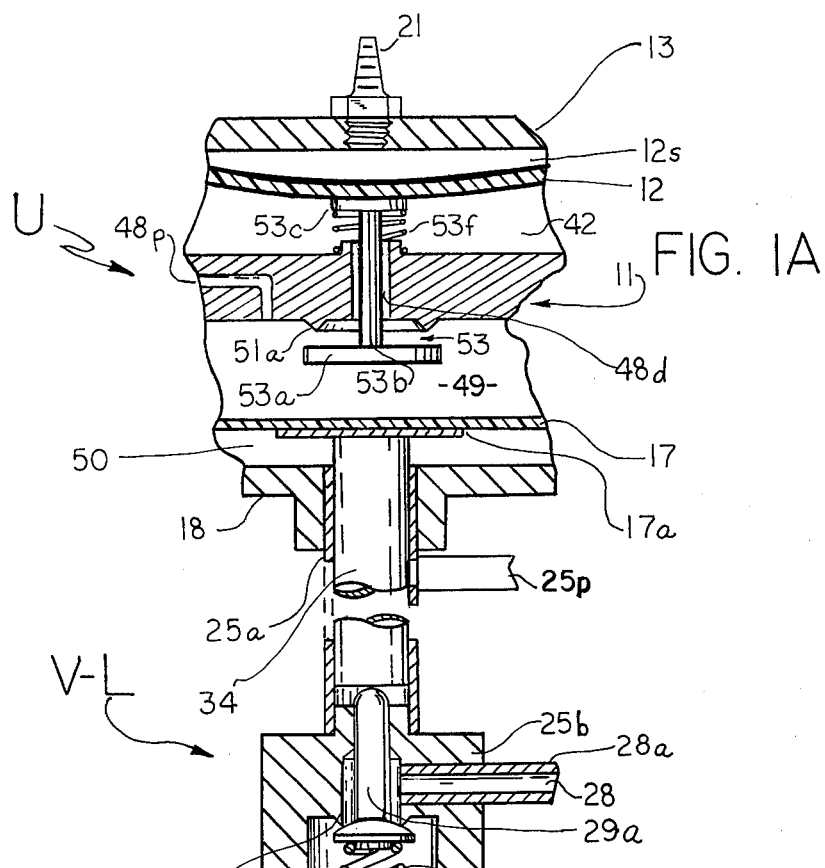
FIG. 1A is a fragmentary view showing a modification of FIG. 1 for a normally closed valving device.

Whereas in the unit of FIG. 1, the liquid valve is normally open, fragmentary FIG. 1A shows a modification where it is normally closed; like or analogous parts being designated by identical or similar reference characters. A modified valving member 29a is biased, by valve spring 30a, toward a normally closed position on a downwardly projecting male conical or beveled seat 27a coaxially formed at the top of the somewhat enlarged inlet passage 26 of the liquid valve body block 25b. The inlet end element 26a not only is a male threaded closure for the spring and valving chamber afforded by the enlarged inlet passage, but also has a coaxial annulus or recess to locate the spring lower end.

A central bottom pilot boss on the valve head similarly locates the spring upper end, while the seat-engageable head upper shoulder surface is beveled or is formed as part of a sphere. Primary guidance of the valve member is provided by the freely sliding reciprocable engagement of the round or reduced shank portion of the valve member in a coaxial bore beyond the flow space to outlet 28. The shank projects into the tube 25a sufficiently for the bottom of rod 34 to contact its rounded upper end with endwise operating clearance from the body block. The power diaphragm 17 is centrally supported by a stiffening disk 17a; which as also in FIG. 1 may either be secured on the top end of 34 or bonded on 17.

Since the power diaphragm in FIG. 1A must depress rod 34 to open the liquid valve, the controller unit portion U is likewise modified to achieve this result in response to the probe signals which are effective to open the valve in FIG. 1, in the manner to be later described in detail only relative to FIG. 1; it being understood that, *mutatis mutandis*, in general the net operation is similar.

In FIG. 1A, the power diaphragm energizing gas, again passing through appropriate fixed resistor or variable resistor means, such as the previously described needle valve, is delivered through passage 48p to operating gas chamber 49 from which it passes subject to control of sensor diaphragm 12, through central passage 48d between chamber 42 and the freely vented chamber 42. Here the seat boss 51a is formed in chamber 49 about the bottom end of passage 48d, rather than at the top of the FIG. 1 passage 48 which there may be considered an extension of chamber 49. The venting control by 12 is attained through a light vent valving element 53 comprising, for cooperation with seat 51a, a valving head disc 53a, a support stem 53b, extending with ample flow clearance through vertical passage 48d, and on the stem upper end a disc 53c parallel to 53a; sub-assemblies being used, e.g., with stem 53b being in two endwise threaded parts, to enable assembling into body 11. The sensor diaphragm 12 bears against disc 53c, with increasing back pressure probe signals to increase venting of 49 by correspondingly depressing 53a away from 51a against the normal closing bias of spring 53f interposed between 53c and the bottom of chamber 42, where a coaxial recess or pilot lip locates the spring bottom.

Before describing the particulars of operation, it is observed that because of the efficiency of the controller device and its quite small dimensions, several units C may be quite conveniently used in a cluster on one supply Dewar vessel arranged as in FIG. 3, which is described below, for liquid valving.

ADJUSTABLE MODIFICATION OF UNIT U—FIG. 4

Figure 4:
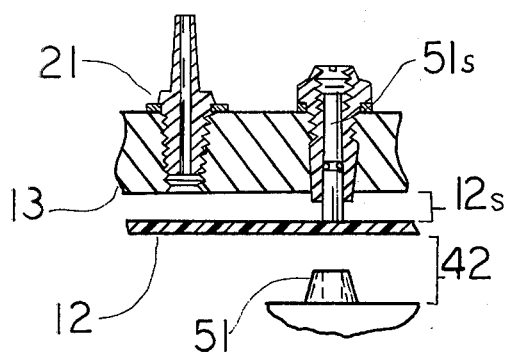
FIG. 4 is a fragmentary view of a gap adjustment means.

In the control unit U, between sensing diaphragm 12 and seat boss 51, adjustability of the normal gap may be provided as in FIG. 4 by the simple expedient of a central screw 51s in alignment with boss 51 threaded gas-tight through the top plate 13 or a fitting therein to bear on and centrally pre-load the diaphragm 12.

LIQUID VALVING—DESENSITIZATION—FIG. 5

Figure 5:
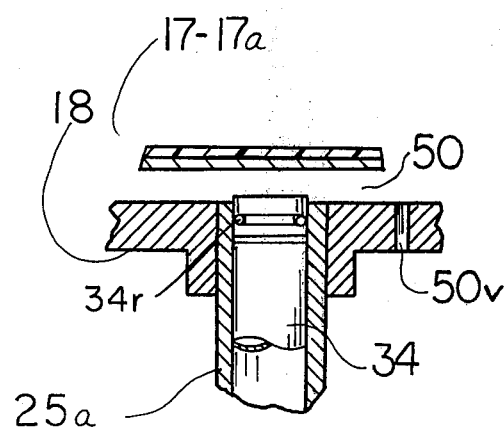
FIG. 5 is a fragmentary sectional view showing a modification of an actuator rod structure.

Desensitization to variations, in characteristics of valved liquids and in characteristics of delivery lines, is obtainable by making the lower side or valve side of the power diaphragm 17 effectively of smaller area than the top side, that is, in terms of areas exposed to pressures of gas originating in the system. This can be conveniently done by grooving a top end cap of rod 34 to receive an O-ring 34 slideably sealing to the valve body tube, and providing a vent duct 50w in the housing structure between the power diaphragm and the upper end of the actuating rod 34 as shown in FIG. 5. Neglecting the clearance sealed by the O-ring, the only area acted upon by closure-opposing discharge line back pressures thus is the end area of the rod. This area can be quite conveniently designed to be on the order of ¼ to 1/5 of the gas working area of the diaphragm; and though still exposed to a considerable liquid and liquid vapor pressure back pressures, by virtue of the smaller area, the rod offers a correspondingly smaller valve closing resistance to diaphragm action than would be the case in FIG. 1 where the lower side of the diaphragm exposed to such pressures in space 50 substantially equals that of the top side.

Consequently the proportional effect of downstream line characteristics or pressure changes is likewise correspondingly reduced. This in effect then can extend the effective adjustment or range obtainable by the use of the needle valve 56. Furthermore this permits valving of the delivery discharge line to permit a wider range of delivery time selection, quite apart from the needle valve adjustment.

A similar result may be attained by providing, in the valve tube wall of the liquid valving form, a precision bleed or gas vent valve which limits the back pressure in the valve body, and therefore the pressure applied to the bottom of the power diaphragm, arising from nitrogen vapor pressue in the valve. This is shown, for example, in FIG. 1A, with the tubular member 25a at a location remote from the valve seat 27a and proximate to the unit body 11, having an adjustable precision bleed device 25p connecting the tubular bore to the atmosphere. A limiting factor here is the fact that in a longer delivery cycle, after the main valve body has been chilled, liquid nitrogen rising in the valve would then start to discharge from the bleed valve.

LIQUID VALVING-POWER GAS SOURCE MODIFICATION—FIG. 6

In the quasi-schematic representation of FIG. 6, a line 90, connected to a lateral nipple 91 on the inlet connector 26a, and including a needle valve 92, runs to the powering gas inlet spud or connector 20 of unit U; whereby some liquid under Dewar pressure passing to needle valve 92 in controlled small amount may be vaporized by heat absorbed in the line 90, thus to supply the operating gas required; a gas pressure controlling pop-off valve 93 then being connected to the line on the gas side of 92. Valve 92 may advantageously be incorporated in the element providing nipple 91. This modification enables a more compact simpler arrangement of the controller and associated lines whether connected directly to a supply Dewar, or to a manifold shut off valve such as 73 in FIG. 3 on a simpler liquid riser or discharge tube of the Dewar.

LIQUID VALVING CLUSTERING MANIFOLD FIG. 3

In FIG. 3, showing a clustering manifold device, A disc base plate 70 is secured to a Dewar flask casing neck flange by screws 70s through interposed bias springs to clamp the rubber stopper 70a of a supply flask represented at S in a fragmentary and generalized manner. A gas supply manifold tube 71, centrally penetrating disc 70 and also the stopper 70a to terminate in gas-tight communication with the flask gas space, is connected and sealed gas-tight at its upper end about and coaxially supports a smaller diameter, bottom-reaching liquid supply riser tube 72. The riser top end is connected by threaded coupling means at 72f to the bottom inlet of a manifold type liquid supply shut-off valve 73. A longitudinally adjustable sealed connection preferably is made by a tubing connecting type arrangement at 71a including a male threaded part on the end of 71, a female-threaded collar theron and a gripping sealing ferrule therebetween, by which riser tube 72 passed therethrough can be releasably gripped and sealed at selected position without swaging the ferrule into a permanent position.

Valve 73 here has four threaded lateral outlets, e.g., as at 73b to directly receive the liquid inlet ends of and thereby mount respective units C. For assembly simplicity, the valve liquid inlet end is male-threaded to couple with a female connector fitting 72f on the end of the liquid supply riser tube.

On the length of gas tube 71 above base plate or disc 70, hence below valve 73, there are threaded and gasketed or otherwise secured into diametrically located holes a pressure gauge 75 and a settable poppet or pressure-establishing relief valve 76 (typically set for say 4 to 6 psig, but desirably settable up to about 25 psig); and at a lower level, four equi-angularly spaced tubing connection spuds 77 are similarly threaded and gasketed to afford respective gas take-off points for tubing 78 to the inlet connections 20–47 of respective controllers C. Advantageously an ancillary similar spud 77a is provided by which a newly connected supply Dewar may be immediately pressurized by connection with an external gas source for operation without waiting for the flask to attain operating gas pressure level by internal evaporation. Preferably the connection elements 77, 77a are known assemblies each including a valve shutting off gas flow when not in use, such as a "quick connect" type fitting.

This arrangement thus results in a close cluster of the controllers and their gas supply tubing about the top of the Dewar liquid supply vessel S, with the liquid shutoff valve handle easily accessible for hand manipulation. From each unit C in the cluster, a sensor probe P in a respective receiver vessel R and also a liquid delivery line or tube 81 run to each point of use.

The cluster hardware unit above described, namely, manifold liquid valve 73, liquid riser tube 72 with gas manifold tube 71 and its associated gauge 75, regulator relief valve 76 and connectors 77, 77a, can be simply connected to a Dewar in which the closure has a tubular discharge nipple, by the simple expedient of a short rubber tube connector clamped to the bottom of gas tube 71 and to the top of the nipple; the latter having the riser tube 72 inserted therethrough into the flask. On the other hand, where the flask closure is a rubber or other elastomeric plug or stopper radially expended to a circumferential seal with the flask mouth by axial compression between end plates developed by a nut and an axial through-bolt, the gas tube 71 in which 72 is coaxial may extend into or through and be sealed to a bore through the bolt or may be an integral part of the bolt structure.

OPERATION LIQUID VALVING—FIG. 1

The operation of the liquid valving unit of FIG. 1 is conveniently discussed relative to FIG. 3. With the supply vessel stopper gas-tight, under normal heat leakage conditions and hence nitrogen evaporation, gas pressure builds up to the poppet valve setting, say 6 psig., in the free gas space above the liquid surface, thus applying gas through the gas manifold to each controller at 6 psig. Also, the vessel gas pressure is tending to force liquid up the riser tube and through the open liquid supply manifold valve 73 to the liquid inlet of each unit C which functions independently of the others as next described. However, if an appropriate separate gas supply is available, the source may be conveniently pressurized immediately to operating level by a connection to the ancillary spud 77a.

In the unit C, energizing gas supplied by a tube 78 is delivered through 47, 58, 59, 12s, 61 and the tubing 80, conveniently at a rate of 10cc/min. or less established by the fluidic resistor 59, to the gas type sensor probe P in the receiving vessel R where liquid nitrogen is to be maintained within a level range or at a desired level, the region or position of which is established by the position of the probe lower open end. The energizing gas is also applied through 47a and 48b, and in space 49, to the inner or top face of power diaphragm 17. When the unit is transferring, and the sensor diaphragm well spaced from the seat at 51, the gas consumption would, of course, be greater, e.g., 50cc/min.

Assuming R initially empty or the liquid level for some reason well below the probe end, there is only a very low back pressure (which may be considered a zero signal pressure) in space 12s on the top side of diaphragm 12, so that gas is permitted to escape freely from 48t through space 42 and vent 52. The space 49 is not to be under sufficient pressure to actuate the liquid control valve to off position against the opening bias of spring 30. Thus, for example, if the bias is equivalent to 0.75 psi on the diaphragm 17 when the member is in totally closed position, therfore bore resistance at 48t must be such that pressure drop through bore 48t is less than 0.75 psi for the highest flow to be had through the needle valve. Accordingly liquid nitrogen is delivered from the supply vessel S through V-L and delivery tubing 81 into vessel R.

On initial fill, when the nitrogen level in the receiver vessel reaches the tip of and closes the probe P (neglecting consideration of some back pressure change due to proximity sensing which is quite small due to the low flow rate), a small but sharp pressure rise or "step" from zero occurs due to liquid surface tension and viscosity effects, after which back pressure builds up linearly in 12s corresponding to the liquid level change. These back pressure rises, in effect feedback signals from the probe to the sensor-responsive diaphragm 12, cause corresponding downward displacements of 12 toward seat boss 51 with throttling of gas flow from 48t. This in turn results in pressure rises in 48, hence in space 49 which act on power diaphragm 17 to apply force through rod 34 on valve member 29. With a complete sealing of passage 48t by diaphragm 12, the pressure in 49 rises to the gas supply pressure, assumed for example, as 6 psig. However, there is an inherent time delay in the pressure response in 49, due to gas compressibility and the finite time required for gas flow into 49, the magnitude of which delay is determined by the setting of needle valve plug 56 for a given structure; with of course increase of the volume of space 49 by power diaphragm displacement increasing the flow time required.

With the supply pressure at 6 psig, for the example given, at a sensor back pressure or feedback signal of ½ inch water (about 0.7 inch liquid nitrogen), the sensor diaphragm 12 starts to move toward the seat 51, and of course narrows the gap with increasing back pressure, i.e., with increasing depth of liquid at the probe, thus as a fluidic amplifier, to control the application (for liquid valve closing) of the much higher pressure on the order of 6 psig; and development of a comparatively high valve-closing force.

Actually under the steady-state conditions of liquid flow through the full-open valve, in addition to the bias of the valve spring, the valve closing action of diaphragm 17 is opposed by pressure in the closed body of the valve applied to the bottom of 17, namely, the vapor pressure of the nitrogen and liquid back pressure due to the resistance of the delivery line on the output side of the valve, (e.g., say a total of about 3 psig.). Hence, for the assumed closing-opposed bias and pressure conditions, a valve closing motion does not begin until a pressure of 3 psig is developed on diaphragm 17; and then the resisting force of the spring builds up with valve closing motion to the equipvalent of 0.75 psig.

It is apparent that the valve shut-off point can be shifted by selection of the bias spring and by the value of the downstream resistance of the liquid delivery line, hence by the selection of a constriction resistance therein.

The tendency here then normally would be a slow linear response, and as closure-opposing forces were overcome, with valve member 29 more or less slowly approaching full seating and closure with final flow ending up in small dribbles; though under the circumstances of closing this is not so objectionable as during opening, since the delivery path is already chilled by the prior flow, and nitrogen loss by evaporation is not so extensive.

With low flow rates in controller passage 48t, Bernoulli force effects are in practice negligible as diaphragm 12 approaches the end face of seat 51. However, with actual closing of 48t by the diaphragm, the pressure in 48, hence 49, does rise sharply to gauge pressure, 6 psig in the situation assumed by way of example.

If the valve has not been closed by other effects, this closure of 48t by the diaphragm 12 represents an ultimate closing operating point; the actual operating point being selectable by choice of the spring constant in the diaphragm 12, and of the gap size between seat 51 and the diaphragm, implicitly then by the effective height of 51 in a given structural situation in the unit U, the probe, the valve, especially the spring bias, and delivery line resistance. Adjustment of the normal gap may be made in the modification of FIG. 4 by use of the central screw 51s.

By operation with the gap pre-set to a small value, the valve actuation may be based upon the previously described small sharp pressure rise or step upon closure of the probe tip by liquid and an opening when it becomes uncovered, though for cryogenic liquids this is usually undesirable because of icing elsewhere adverted to.

However, be operating conditions such that before 12 seats on 51 the pressure developed in 49 is effective to start overcoming the closing-resisting force (e.g., 3.0 psig above stated) and to start to bring valve member 29 toward closed position, the throttling of the liquid flow decreases the vapor pressure and liquid back pressure component of the total force resisting the closing, (e.g., to 2.9 psig), rendering the closing pressure more effective for closing motion, causing further throttling effect, and in retrograde fashion, as it were, by feedback within the valve, accelerating the closing in a quasi-snap action manner, and this despite the increasing spring resistance. When the valve is closed and the discharge line back pressure has dropped to zero, and with the nitrogen vapor pressure dissipated after drainage and evaporation, the full force developed by the pressure in space 49 acting on the diaphragm 17 minus of course the spring force is effective to hold the valve member closed.

Actually a timed over-fill, that is, continued delivery after valve opening at a point where the probe tip is still covered, is advantageously achieved by the setting of needle valve plug 56; in other words, a control of a delivery started preferably before the nitrogen in the receiver has dropped below the probe tip, and terminated when a selectable higher level is restored. With increase of the flow rate from 47a, the overfill time is shortened; that is, the permitted level range is shortened. For increased flow rates allowed by the needle valve, then due to the increased pressure drop across the resistance of the fine bore branch at 48t, (on order of 0.013 inch diameter), and a consequent higher pressure toward the power diaphragm chamber, the power diaphragm is more heavily biased toward valve closure. A similar change of situation results from increased supply pressure; which, however, even up to 25 or 30 psig supply, for the disclosed sensor chamber—seat aperture area ratio involved at the sensor diaphragm, on the order of $10^4$, has no practical effect in the turn on point.

Thus in a 6 inch diameter Dewar receiver with a small unit of this type, an 8 inch level difference was obtainable as one extreme; yet at the other extreme, the unit could be so set that a level could be readily held within a much closer range, e.g., = 0.020 inches; and in fact, contrary to certain theoretical considerations for the sensing system, held within a quite minor fraction of the latter value, when the end surface of boss 51, about the mouth of passage 48t, was reduced to a circular "knife edge".

With needle valve 56 set for delivery of about 50 cc/min from the 6 psig nitrogen gas supply and with 10 cc/min flow to the sensor, for example, the level was being held at ± 1/16 of an inch, in the particular instance the valve turning on when the nitrogen liquid level dropped to ¾ inch probe tip immersion, with turn-off when the level had risen to 7/8 inches.

Since throttling needle valve adjustment by 56 becomes erratic when adjusted to low flow, the volume of the space 37, hence the effective space of 49 can be changed as needed, when the erratic flow condition is approached, either by setting of plug screw 36 or, with 36 removed, by screwing into the threaded passage a connector of a selected commercially available precision volume component. A volume increase has the same effect as a further throttling of the gas flow, since either change increases the time required to effect any given increment of pressure change.

With drop in the receiver vessel nitrogen level by evaporation as the probe line back pressure decreases in the space 12s, the withdrawal of diaphragm 12 from the seat boss 51 and corresponding gas flow increase from 48t causes a slow drop of the pressure in 48 and hence in space 49, in a more or less linear response to the level drop. Thus the force exerted by diaphragm 17 on the push rod 34, therefore on valve member 29, is gradually decreasing. Ordinarily the valve would tend to open initially very slightly and gradually, beginning when the pressure in 49 had dropped to 0.75 psig for the assumed example conditions and spring force, and would for some time undesirably allow liquid nitrogen to enter the now warm delivery tubing in tiny amounts there to evaporate as waste.

However, upon that dropping pressure reaching 0.75 psig, in such initial discharge from the inlet passage 26, a droplet or so passes member 29 to encounter above the valve seat relatively "hot" metal of body tube 25a, and is instantly flashed into vapor, developing in the space between rod 34 and member 29 a transient pressure of about 25–30 psi which instantly shifts rod 34 and hence diaphragm 17 upward; followed quickly by wide opening of the valve member 29 under opening bias of spring 30, in what amounts to a snap-action opening. The relatively closed system between rod 34 and tube 25a sealed to diaphragm 17 through flanged plate 18 enables this snap-action.

On initial installation for a given controller in a particular environment and equipment set up, the probe is temporarily clamped well down in the receiving vessel R, and the system gas and liquid supplies turned on to deliver liquid nitrogen to R. The liquid level on the probe at turn-off is marked; and so also, after evaporation to a turn-on, the lower level for this turn-on is marked on the probe. Thereafter the probe is finally clamped with the lower ("turn-on") mark located at the height of the desired minimum liquid level in the vessel. If the height of the turn-off point is not acceptable for the higher level in the vessel, then the needle valve setting is varied as required to bring the turn-off point, "fill" or "maximum" level to the height desired. If perchance on the initial fill, the controller does not turn off the valve, a momentary supply shut off valve closure with immediate reopening will stabilize operation, so that as cycling is carried on through evaporation, to turn on and fill, the second cycle fill will be found to terminate automatically as intended.

OPERATION — GAS VALVING

The valve form of FIG. 2 advantageously handles gas as the valved fluid, in a liquid dispensing system where a separate gas source supplies the energizing gas used for sensing, amplification and liquid pumping; and the supply Dewar delivery is effected by applying such external gas pressure in the gas space of the supply vessel to expel liquid through a riser; and the flow is abruptly terminated by not only cutting off the applied pressure but by then also quickly venting the pressurized space.

In such case the level sensing probe is connected as previously to the controller unit as 21; the external gas pressure source is connected both to the logic amplifier gas inlet 20 and also to the inlet 31a; while the outlet connector 32a is connected to the sealed Dewar supply vessel gas space, which consequently may be pressurized from 31a or vented by the valve action. Though the application of pressure from an external gas source is here relied on for moving the liquid out of the Dewar, the controller action is basically the same, apart from a type of snap-action to be described for FIG. 1. However, feedback from the Dewar pressurizing and venting line is advantageously used as will be later described.

The gas valving device represented by FIG. 2 is quite useful for controlling liquid helium levels, using an external energizing gas source for the sensor probe and actuator energization, and to pressurize the liquid helium source vessel, rather than the liquid valve of FIG. 1, since the low heat of vaporization for liquid helium dictates rather that it be moved directly from the source vessel to the site of use, with a minimum contact with warm bodies such as valves. For liquid hydrogen either the "self-powered" application (FIG. 1) or externally pressurized approach (FIG. 2) may find advantageous use.

In the case of the device of FIG. 2, applied to control of cryogenic liquid level in a receiver which is supplied from a Dewar pressurized from an external gas supply to effect delivery and vented to cut off delivery, with the gas valve V-G controlling the gas supply and the venting, the feed back connection, described as includable in the FIG. 2 structure, is useful. As the normally open biased gas valve opens somewhat, the pressure in the line 32b is applied through feedback line 33f to the underside of the power diaphragm, additively with the valve opening bias, accelerating the valve opening for rapid application of the supply gas pressure to the supply vessel. This ensures against a partial shift of the valve member to a stable position venting the gas inlet, without sufficiently pressurizing the supply vessel to effect any transfer, again promoting a quasi-sharp action in the valve opening. Usefully there is an adjustable resistance in the inlet line, which may be incorporated as a valve in the inlet connection of the gas valve.

Such feedback connection and resistor also may readily be incorporated internally in the valve assembly, so that in addition to the sensor line, only one tube from valve outlet to supply vessel, and a second from external gas supply to gas inlet, are required.

Experience has shown that with use of a sensing probe of the described type in a Dewar, if the liquid nitrogen level is permitted to drop below the probe tip, atmospheric moisture may condence on the uncovered tip as frost or more solid ice to an extent causing erratic performance or even blocking and rendering the probe and thereby the entire sensing system useless.

Therefore it is desirable that the controller be designed to turn on say when the level has dropped to about ¾ of an inch above the probe tip, a quite safe level from the view point of frosting and the precision or reproducibility of the turn-on operation attainable by the invention.

It is noted incidently that a phase separator is advantageously used at the discharge end of the delivery line from the liquid valve in the usual environment of use. For heat absorbed by the delivery line after each delivery cycle evaporate nitrogen at the leading end of the advancing column of the next delivery, until the line is chilled, usually resulting in a considerable initial blast or discharge of gaseous nitrogen for as long as 30 seconds, the force and extent of which in some situations can sweep from the receiver vessel, a large residual liquid nitrogen volume often many times the volume which would be required to maintain the level in response to the probe signal.

Especially where a universal controller unit U is desired, adapted to diverse actuator applications, or even though intended for say handling of a particular liquid such as nitrogen, yet where there may be quite different delivery line characteristics in length, bends, bore diameters, etc., which affect the fluid flow pressure drop, then advantageously for such liquid valving purposes, the unit is desensitized to such variations and applications with other advantages as previously noted.

Considerable desensitization is obtainable by use of the modification of FIG. 5, wherein the lower side or valve side of the power diaphragm 17 effectively has a smaller area exposed to the system-originated pressures than does the top side.

It may be noted that with various non-volatile non-cryogenic liquids where sensitive level control is desired, devices of the present invention may have quite advantageous application. Thus a level of a molten salt, or molten caustic or a molten metal such as sodium, an acid such as concentrated sulfuric acid or hot corrosive solutions, may be required to be controlled in a container by addition of further liquid as in a processing bath where there is loss by carry-out on objects treated, or by reaction. In such cases, a gas type level sensing probe may be again used, obviously with the probe itself being constituted of material resistant to the liquid and the energizing gas inert bath in sense of chemical reactivity and of solubility acceptable for the purpose. The actuator unit U then may serve as a very sensitive device operated with a low gas consumption to actuate a gas valve similar to V-G, directly controlling flow from a source under gravity or other pressure head, to actuate a switch controlling a remote valve or a relay for the latter, or perhaps a solid feeding device feeding the solid form of the molten bath material.

DUAL PROBE — FIG. 7

Because of the sensitivity of the controller unit U, and the inherent cycle hysteresis it is advantageously used with dual probe sensor configurations, (see FIG. 7) with the sensor line from 21 feeding gas through a Tee device to respective probe lines 80a, 80b, the probes $P_1$, $P_2$ of which either are set at different levels in one vessel as in FIG. 6 for generating additive signals when the liquid level reaches the respective probe tips (or a particular level above each), or are disposed in respective vessels for comparing the relative levels therein. In such arrangements, an adjustable resistor 83 in the line to the higher level probe is provided to balance or otherwise adjust the resistance (hence flow) therein relative to the inherent resistance (hence flow) in the line to the lower level probe, at a selected reference level or immersion of the latter, which yet leaves the higher probe uncovered. For overall adjustments, a variable resistor is also located in the sensor line feeding the Tee similar to resistor 59 in function; and a further variable resistor may of course be included in the line to the lower probe.

However, for greater flexibility of use and adjustment, the particular configuration of FIG. 7 is advantageous. There the gas delivery from a gas source line 78a to both probes is made adjustable by supplying energizing gas not only through the supply passage 47 to the needle valve 56, but through a branch 58a (internal or external of the control unit) also to variable probe flow level adjusting resistors 85, 86 by which it is applied respectively to the low level probe line 80a, and through resistor 83 to the high level probe line 80b.

The back pressures are taken directly from the low level probe line 80a and through variable resistor 87 from the upstream side of the high level probe line resistor 83, to be applied jointly to the sensor diaphragm 12s, e.g., through sensor connector 21.

Though the several resistors and appropriate passages can be provided in a unit U for this purpose so that a single gas supply connection may be used at 20, with an additional probe connector say for 80b, conveniently these may be all incorporated in an auxiliary unit D. In such a unit D, there are respective probe line connectors for 80a and 80b; a gas supply connection for 58a where there is external Tee branching of the gas supply line (or also an additional connector for a line to connector 20 where the auxiliary unit internally provides the branching of the supply rather than an external Tee); and finally a single signal line connector for a line to sensor connector 21. In case an auxiliary unit D is thus used, then for unit U as shown and previously described, the resistor 59 would be given an infinite resistance; i.e., the internal passage 58 to sensor diaphragm top space 12s is blocked.

With the probes in one vessel, the sensor system is adjusted so that the signal generated back pressure (i.e., feedback) in the sensor line to the controller is low enough to start delivery when the liquid level has dropped to a point a selected distance just above the lower probe tip. With the rising level as the liquid transfer continues, the increased head increases the feed back pressure, even though there is a continued gas discharge from the not yet immersed higher probe. Upon the liquid level reaching the latter, the increasing back pressure exhibits a sharp rise of "step" which can effect a quick and definite turn-off of the liquid valve.

It may be noted that the controller may be easily made sensitive enough for use with a "static pressure" response to changing level, i.e., where there is a volume of non-flowing gas trapped in the sensor chamber, the probe line, probe and sensed liquid; the gas of course being compatible, i.e., non-reactive with and insoluble in the liquid.

What is claimed is:

1. A gas energized fluidic controller unit responsive to gas pressure signals to produce a mechanical motion output, said controller unit comprising:
a housing including a body and providing
a first chamber for a sensor diaphragm, and
a second chamber for a power diaphragm;
a sensor diaphragm mounted in the body and spanning said first chamber to define
a sensor gas space on one side of the sensor diaphragm;
a sensor signal gas line connection on the housing communicating with said sensor gas space
to shift the sensor diaphragm responsively to sensor signal gas pressure;
a power diaphragm mounted in the body and spanning said second chamber to define on one side of the power diaphragm
a power diaphragm operating gas space;
an energizing gas connection on the body as a gas inlet and in constant communication with said operating gas space and sensor gas space a venting passageway in said body from said operating gas space to atmosphere;
venting controlling means including said sensor diaphragm for controlling flow of gas through said venting passageway to atmosphere responsive to sensor signal gas pressure thereby varying gas pressure in said operating gas space to shift the power diaphragm;
means supported by said housing including a shiftable element opposed to the said other side of the power diaphragm and shiftable by the power diaphragm for the mechanical motion output of the unit.

2. A unit as described in claim 1, wherein
the sensor diaphragm divides said first chamber to define therein also
a vented space, on the other side of the sensor diaphragm, having a vent outlet to atmosphere;
the power diaphragm divides said second chamber to define therein
a second space, on the other side of said power diaphragm, wherein
said shiftable element is engaged by the power diaphragm;
said venting passageway is provided by an energizing gas branch passageway in said body
opening at one end to said power diaphragm operating gas space and at its other end opening to said vented space;
said venting controlling means comprising
a seat boss formation through which said other end of the branch passageway opens to the vented space, and
the said other side of said sensor diaphragm normally spaced from said boss to provide a flow gap whereby movement of the sensor diaphragm varying the gap varies gas flow from said branch passageway to the vent outlet;
a communicating passageway in said body from said inlet, opening to, and intermediate said ends of, said branch passageway through a mouth thereby to provide said constant communication; and an adjustable needle valve member in said body controlling gas flow through said communicating passageway mouth to said branch passageway.

3. A unit as described in claim 1, wherein
the power diaphragm divides said second chamber to define therein
a second space, on the other side of said power diaphragm, wherein said shiftable element is engaged by the power diaphragm;

said venting passageway is provided by a passageway in said body
opening at one end to said power diaphragm operating gas space and at its other end opening through a vent outlet to atmosphere;

said venting controlling means further comprising
a seat boss formation through which the last said passageway opens to said operating gas space, and
a valving element cooperative with and biased toward said seat boss and engaged with said sensor diaphragm,
whereby movement of the sensor diaphragm varying a gap between said valving element and said seat boss varies gas flow from the power diaphragm operating gas space to the vent outlet;

a communicating passageway in said body from said inlet, opening to said operating gas space thereby to provide said constant communication; and a selected resistance or an adjustable needle valve member in said body controlling gas flow through said communicating passageway to said operating gas space.

4. A gas energized fluidic controller unit as described in claim 1, and particularly adapted to use in response to gas pressure signals from a sensor such as gas type probe discharging gas and developing back pressure changes as signals corresponding to events changing the fluidic resistance through the sensor, and further including:
a communicating passageway in said body from the energizing gas connection, to said sensor gas space to provide sensor gas flow to a sensor such as a probe connected to said sensor signal gas line connection.

5. A unit as described in claim 4, wherein
a flow resistor is incorporated in said communicating passageway.

6. A unit as described in claim 5, wherein
said flow resistor is a needle valve type variable resistor incorporated in said body.

7. A unit as described in claim 1, wherein
a liquid flow control valve, having a liquid inlet, a liquid outlet and a reciprocating valve member, is supported by said housing, and includes as said shiftable element an element effecting valve member reciprocation from a valve normal position to a valve non-normal position.

8. A unit as described in claim 2, wherein
a gas flow control three-way valve, having a gas valve inlet, a gas valve outlet, a gas valve vent and a reciprocating valve member, is supported by said housing and includes as said shiftable element an element effecting valve member reciprocation from a valve normal position to a valve non-normal position;
said gas valve inlet being closed from the valve outlet and vent and said outlet open to the valve vent when the valve member is at closed position;
said valve inlet being open to the valve outlet and the outlet closed from the vent when the valve member is at open position.

9. A unit as described in claim 2, including
means on said housing for adjustably pre-loading said sensor diaphragm to establish the maximum gap available relative to said seat boss.

10. A unit as described in claim 2, wherein
said body includes an ancillary chamber in communication with said power operating diaphragm gas space, and adjustable means to vary the volume of the ancillary chamber, thereby to vary the effective volume of the last said gas space.

11. A unit as described in claim 1, wherein
both said diaphragms include an elastomeric operatively shiftable diaphragm portion,
and further including a stiffening disc for the elastomeric
shiftable portion of said power diaphragm interposed between, and secured to one of, said shiftable element and said power diaphragm.

12. A unit as described in claim 7, wherein
said liquid flow control valve comprises a valve body portion having
one end connected to the said body of the unit and a valve bore having one end opening through said one end of the valve body portion into a second space defined on the other side of the power diaphragm in the second chamber;
said liquid inlet being located at the other end of the body portion and
opening endwise to said bore through a valve seat formation coaxially disposed in the other end of the bore,
said liquid outlet opening laterally from said bore at a location proximate to said seat,
said valve member reciprocating in said bore between a closed position against, and open positions away from, said seat,
said valve member biased open away from said seat,
said shiftable element comprising a rod element slideably supported in said bore between said valve member and said power diaphragm.

13. A unit as described in claim 12, wherein
the said one end of the valve bore is in sealed communication with
said second space of the power diaphragm chamber.

14. A unit as described in claim 12, wherein
said rod element is slideably sealed to the valve bore;
said second space is vented to atmosphere; and
said rod element has a diameter smaller than the diameter of the operatively shiftable portion of said power diaphragm, thereby to desensitize the valving action by reduction of the movable element area exposed, when the valve is open, to pressures in the valve bore arising from outlet line flow back pressure and liquid vapor pressure of the valved liquid, against which said power diaphragm must operate on closing.

15. A unit as described in claim 8, wherein
said second space of the unit is closed by a housing component supporting the said gas control valve;
said unit being provided with a gas pressure feedback line connection
opening into said second space and
adapted for connecting to a pressure tap in a gas discharge line from the gas valve.

16. A gas energized fluidic control unit as described in claim 2, wherein
the housing body comprises a cylindrical block having in opposite end faces coaxial recess formations adapted to receive respective disc-like cover members to define a said first chamber and a said second chamber, each said recess formation having an internal circumferential groove for receiving a respective cover retainer ring;

respective said diaphragms are in the recess formations;

and said unit includes means located in each said recess formation for supporting the respective diaphragm clamped therein by the respective cover member;

cover members in the respective recess formations and spring type retainer rings therefor securing the same in diaphragm clamping disposition;

a longitudinal central axial small diameter bore opening at its opposite ends to end walls of the respective recess formations, as said branch passageway, said branch passageway opening to the recess formation providing the said first chamber through a conical seat boss engageable by the sensor diaphragm;

said body having a vent passage extending from the sensor diaphragm-receiving recess formation outwardly to atmosphere to provide the vent outlet for said vented space, said vent passage being greater in flow cross section than said branch passageway, said body at a location intermediate the ends thereof having a first lateral bore with an energizing gas connecting fitting screwed into the outer end thereof, the said communicating passageway opening from said lateral bore through a said mouth to the branch passageway, a second lateral bore in said body intersecting the branch passageway at the region of said mouth and having a threaded portion and a said needle valve element threadably engaged therein to present a needle valving portion extending into and co-operating with said mouth to control flow of energizing gas from the energizing gas inlet connection into the branch passageway.

17. A gas energized fluidic control unit as described in claim 16, wherein the recess formation providing said cover member for recess formation providing said first chamber has a passage therethrough provided with a sensor signal gas line connection fitting; and the cover member for the other recess formation provides support for said means including said shiftable element, the shiftable element being slideably supported perpendicular to said power diaphragm.

18. A unit as described in claim 16, including a second communicating passageway extending from the said first lateral bore to the region endwise outward of the normal disposition of the plane of the sensor diaphragm; and means providing communication from the last said passageway to said sensor gas space.

19. A unit as described in claim 16, including a threaded laterally opening bore in the body block inwardly communicating with the power diaphragm operating gas space;

and, in the last said bore, a threadably engaged plug rotatably slideably sealed therein;

whereby upon axial shift of the plug the effective volume of the power diaphragm operating gas space is varied.

20. A gas energized unit as described in claim 16, including a threaded laterally opening bore in the body block inwardly communicating with the power diaphragm operating gas space and closed by a threaded plug and adapted upon removal of said plug for connection of a precision volume component increasing the effective volume of the power diaphragm operating gas space.

21. A unit as described in claim 13, wherein said valve body includes a tubular member providing the major longitudinal extent of the valve body bore;

the length, cross section and thermal conductivity of material used in said tubular member being selected for a low heat leakage to the valve seat region;

said tubular member at a location remote from the valve seat and proximate to the unit body having an adjustable precision bleed device connecting the tubular bore to atmosphere.

22. A unit as described in claim 7, further including a lateral nipple on the liquid inlet of said liquid flow control valve, as a branch receiving liquid as well as said valve;

means providing a fluid flow passage from said branch to said connection on the body serving as an inlet for energizing gas;

a needle valve in said fluid flow passage; and a pressure controlling vent valve connected to the fluid flow passage at a point between the needle valve and the said connection on the body; whereby through ambient heat transferring to liquid in said fluid flow passage, a needle valve controlled amount of a cryogenic liquid fed to the said liquid inlet is vaporized to supply energizing gas for the unit.

23. A gas energized fluidic controller unit responsive to gas pressure signals to produce a mechanical motion output, said controller unit comprising;

a housing including a body block coaxially recessed at opposite ends affording a first and second recess, and a first and a second cover plate for said recesses thereby providing at said recesses respectively, a first chamber for a sensor diaphragm, and a second chamber for a power diaphragm;

a sensor diaphragm mounted in and spanning said first chamber to define a sensor gas space on one side of the sensor diaphragm;

a sensor signal gas line connection on the housing communicating with said sensor gas space to shift the sensor diaphragm responsively to sensor signal gas pressure;

a power diaphragm mounted in and spanning said second chamber to define, on one side of the power diaphragm, a power diaphragm operating gas space;

an energizing gas connection on the body as an energizing gas inlet, and passageway means in the housing putting said gas inlet in constant communication respectively with said operating gas space to provide operating gas pressure in the operating gas space and with said sensor gas space to provide sensor signal gas to said sensor signal gas line connection through the sensor gas space whereby variations in flow resistance of a sensor probe connected to the sensor signal gas line connection develop sensor signal gas back pressure variations appearing in said sensor gas space;

a venting passageway in said body from said operating gas space to atmosphere;

venting controlling means including said sensor diaphragm for controlling flow of gas through said venting passageway to atmosphere responsive to sensor signal gas pressure thereby varying gas pressure in said operating gas space to shift the power diaphragm;

means supported by said second cover plate including a shiftable element opposed to the said other side of the power diaphragm and shiftable by the power diaphragm for the mechanical motion output of the unit.

24. A unit as described in claim 23 with said passageway means including a first passage in said body at one end communicating with the energizing gas connection and other end opening through an aperture in a cover-plate supporting shoulder at the first recess, a bridging passage in the said first cover plate with one coinciding with said aperture and other end opening into the said sensor gas space; and a flow restriction device in said bridging passage.

25. A unit as described in claim 24, wherein the sensor diaphragm divides said first chamber to define also a vented space, on the other side of the sensor diaphragm, having a vent outlet to atmosphere;

the power diaphragm divides said second chamber to define therein a second space, on the other side of said power diaphragm, wherein said shiftable element is engaged by the power diaphragm;

said venting passageway is provided by an energizing gas branch passageway in said body opening at one end to said power diaphragm operating gas space and at its other end opening to said vented space;

said venting controlling means comprises a seat boss formation through which said other end of the branch passageway opens to the vented space, and the said other side of said sensor diaphragm normally spaced from said boss to provide a flow gap whereby movement of the sensor diaphragm varying the gap varies gas flow from said branch passageway to the vent outlet;

a communicating passageway in said body from said inlet, opening to and intermediate said ends of, said branch passageway through a mouth thereby provides said constant communication with said operating gas space; and an adjustable restriction in said body controls gas flow through said communicating passageway mouth to said branch passageway.

26. A gas energized fluidic control unit as described in claim 23, wherein the housing body comprises a cylindrical block having, in opposite end faces to define said recesses, coaxial recess formations adapted to receive respective disc-like members as said cover plates, each said recess formation having an internal circumferential groove for receiving a respective cover retainer ring;

respective said diaphragms are clamped in the recess formations; and said unit includes means located in each said recess formation for supporting the respective diaphragm clamped therein by the respective cover member;

cover plate members in the respective recess formations and spring type retainer rings therefor securing the same in diaphragm-clamping disposition.

27. A unit as described in claim 23, wherein a liquid flow control valve, having a liquid inlet, a liquid outlet and a reciprocating valve member, is supported by said second cover plate, and includes as said shiftable element an element effecting valve member reciprocation from a valve normal position to a valve non-normal position.

* * * * *